United States Patent [19]

Keith

[11] Patent Number: 5,285,402
[45] Date of Patent: Feb. 8, 1994

[54] MULTIPLYLESS DISCRETE COSINE TRANSFORM

[75] Inventor: Michael Keith, Holland, Pa.

[73] Assignee: Intel Corporation, Santa Clara, Calif.

[21] Appl. No.: 796,317

[22] Filed: Nov. 22, 1991

[51] Int. Cl.$^5$ .............................................. G06F 7/38
[52] U.S. Cl. .................................................. 364/725
[58] Field of Search ............................. 364/725, 726

[56] References Cited

U.S. PATENT DOCUMENTS

| | | | |
|---|---|---|---|
| 4,449,194 | 5/1984 | Wilhelm | 364/725 |
| 4,791,598 | 12/1988 | Liou et al. | 364/725 |
| 4,829,465 | 5/1989 | Knauer et al. | 364/725 |
| 5,054,103 | 10/1991 | Yasuda et al. | 364/725 X |

FOREIGN PATENT DOCUMENTS

0250152A2 12/1987 European Pat. Off. .

OTHER PUBLICATIONS

"The Multiply-Free Chen Transform—A Rational Approach to JPEG", Allen and Blonstein, Picture Coding Symposium, 1991, pp. 237-240.

Primary Examiner—Tan V. Mai
Attorney, Agent, or Firm—Carl L. Silverman; James E. Jacobson; William H. Murray

[57] ABSTRACT

A method is disclosed for performing a discrete cosine transform on a transform input value wherein the discrete cosine transform has a plurality of predetermined transform coefficients. A number $N_1$ of shift operations is determined independently of the transform input value in order to provide a set of $N_1$ of shift operations. A number $N_2$ of add operations is determined independently of the transform input value in order to provide a set of $N_2$ add operations. The transform input value is operated upon only by the $N_1$ shift operations and the $N_2$ add operations to provide a discrete cosine transform output value without any multiplication. This method may be applied to both forward and inverse discrete cosine transforms. The transform coefficients are simplified coefficients which are provided by truncating and modifying prior art transform coefficients. This simplification is adapted to provide coefficients which require fewer than a predetermined number of shift and add operations in order to determine an approximation of the product which would result from a multiplication by the coefficient. The simplification of the coefficients causes degradation of a video image transformed using the simplified coefficients. Therefore the simplification is constrained to cause an acceptable amount of image degradation.

20 Claims, 5 Drawing Sheets

MULTIPLYLESS DISCRETE COSINE TRANSFORM

1. FIELD OF THE INVENTION

This invention relates to the field of discrete cosine transforms and in particular to a discrete cosine transform method having lower computational requirements.

2. BACKGROUND ART

The two-dimensional discrete cosine transform is a pair of mathematical equations that transforms one $N \times N$ array of numbers to or from another $N \times N$ array of numbers. The first array typically represents an $N \times N$ array of spatially determined pixel values which form the digital image. The second array is an array of discrete cosine transform coefficients which represent the image in the frequency domain. This method of representing the image by the coefficients of its frequency components is a special case of the discrete Fourier transform. The discrete Fourier transform is the discrete version of the classic mathematical Fourier transform wherein any periodic waveform may be expressed as a sum of sine and cosine waves of different frequencies and amplitudes. The discrete cosine transform, like the Fourier transform, is thus a transform which transforms a signal from the time domain into the frequency domain and vice versa.

It is well known in the art to use these discrete cosine transform coefficients for image compression. In combination with other techniques, such as color subsampling, quantization, Huffman coding and run-length coding, the discrete cosine transform can compress a digital color image by a factor of approximately thirty to one with virtually no noticeable image degradation. Because of its usefulness in image compression, the discrete cosine transform is an integral part of several image compression standards used by international standards committees such as the International Standards Organization.

There are two basic discrete cosine transform equations. The first basic equation is the forward discrete cosine transform which transforms the pixel values into the discrete cosine transform coefficients. The second basic equation is the inverse discrete cosine transform which transforms the discrete cosine transform coefficients back into pixel values. Most applications of the discrete cosine transform for images use eight-by-eight arrays wherein N therefore has a value of eight. Assuming then that N has the value of eight when performing the transforms, where $p(i,j)$ are the values of the pixel array and $f(u,v)$ are the values of the discrete cosine transform coefficients, the equations of the discrete cosine transforms are as follows.

The forward discrete cosine transform may be expressed as:

$$f(u,v) = (1/4)C(u)C(v) \sum_{i=0}^{7} \sum_{j=0}^{7} cosval(i,u)cosval(j,v)p(i,j) \quad \text{Equation (1)}$$

The inverse discrete cosine transform may be expressed as:

$$p(i,j) = (1/4) \sum_{u=0}^{7} \sum_{v=0}^{7} C(u)C(v)cosval(i,u)cosval(j,v)f(u,v) \quad \text{Equation (2)}$$

-continued where $$C(k) = 1/sqrt(2) \text{ for } k = 0$$
$$= 1 \text{ for } k > 0$$

and $cosval(x,y) = cos((2x + 1)y*\pi/16)$ with $$p(i,j) = -128 \text{ to } +127$$
$$f(u,v) = -1024 \text{ to } +1023.$$

The forward and reverse discrete cosine transform operations of Equation (1) and Equation (2) may be represented by the diagram shown in prior art FIG. 1. Forward discrete cosine transform 12 of Equation (1) transforms eight-by-eight array 10 of pixel values in the spatial domain to an eight-by-eight array 16 of discrete cosine transform coefficients in the frequency domain. Inverse discrete cosine transform 14 performs the reverse transformation. Discrete cosine transform coefficient array 16 represents the frequency content of the $p(i,j)$ function, separately, in both the horizontal and vertical directions. Since discrete cosine transform 12 operates on two-dimensional array 10, it is referred to as two-dimensional discrete cosine transform 12. In the result of two-dimensional transform 12 the horizontal dimension of coefficient array 16 represents the horizontal frequency and the vertical dimension of coefficient array 16 represents the vertical frequency.

In $f(u,v)$ array 16 or frequency domain array 16, frequencies increase with increasing value of the $(u,v)$ indices. Discrete cosine transform coefficient 17 in the upper left corner of array 16 corresponds to zero frequency in both horizontal and vertical directions, and is referred to as the DC term of frequency domain array 16. From forward discrete cosine transform Equation (1), it can be seen that $f(0,0)$ coefficient 17 is equal to the average of all sixty-four $f(i,j)$ pixel values, multiplied by a scaling factor. It is well known in the art that $f(0,0)$ coefficient 17 or DC term 17 has this characteristic. The other sixty-three $(u,v)$ coefficients within discrete cosine transform coefficient array 16 represent amplitudes of cosine waves of increasing frequency and are therefore AC coefficients.

Referring now to prior art FIGS. 2A–D, there are shown eight-by-eight spatial domain arrays 30, 32, 34, and 36 of pixels and their corresponding frequency domain discrete cosine transform coefficient arrays 38, 40, 42 and 44. Darker squares in spatial domain arrays 30, 32, 34, 36 represent darker pixels. It will be understood that the relative darkness of squares in arrays 30, 32, 34, 36, 38, 40, 42, 44 is represented by the density of stippling. Darker squares in frequency domain arrays 38, 40, 42, 44 represent smaller discrete cosine transform coefficients and lighter squares represent larger coefficients.

The image represented by spatial domain array 30 is thus completely flat since all squares in array 30 are the same level of darkness. Therefore discrete cosine transform array 38, corresponding to spatial domain array 30, contains only a single DC term 38a. All other sixty-three coefficients of discrete cosine transform array 38 are zero and are thus represented as black with the brightest density of stippling.

The image represented by spatial domain array 32 however, has a slowly varying horizontal gradient. Therefore, discrete cosine transform array 40 or frequency domain 40, corresponding to spatial domain array 32, contains not only DC term 40a but also contains a small number of low-frequency horizontal frequency terms 40b,c. The high-frequency horizontal terms and all vertical frequency terms of discrete cosine transform array 40, however, are all zero.

The image represented by spatial domain array 34 contains sharp horizontal edge 34a. Sharp horizontal edge 34a causes all eight vertical frequency bands represented by squares 42a-h of discrete cosine transform coefficient array 42 to indicate energy. Because horizontal edge 34a of spatial domain array 34 is encountered when tracing vertically through the image represented by array 34, and all eight cosine waves represented by squares 42a-h are needed to produce a sharp edge after forward discrete cosine transform 12 is performed. Thus all eight terms 42a-h of corresponding discrete cosine coefficient transform array 42 are nonzero and are indicated as lighter than the remaining squares of array 42 with a lower density of stippling. All fifty six horizontal frequencies of corresponding discrete cosine transform array 42 are zero and are represented as dark squares because the image of spatial domain array 34 is smooth in the horizontal direction.

The image represented by spatial domain array 36 contains a single isolated pixel 36a. This produces energy in all sixty-four discrete cosine transform coefficients of corresponding discrete cosine coefficient transform array 44. This energy is produced in all sixty-four cosine terms of frequency domain array 44 because isolated pixel 36a of spatial domain array 36 produces a sharp transition in both the horizontal and vertical directions. Thus sixty-four cosine terms must be provided to produce a single-pixel two-dimensional impulse function as represented by pixel 36a of spatial domain array 36.

Another important feature of discrete cosine transforms 12, 14 is that they are reversible, information-preserving, transformations. This means that exactly the same image information is present in spatial domain p(i,j) array 10 as in frequency domain f(u,v) array 16. The information in arrays representations 10, 16 is merely represented in different forms. Both array representations 10, 16 contain exactly the same information, and they can be converted from one representation to the other by applying the appropriate discrete cosine transformation 12, 14.

It is this reversible feature of discrete cosine transforms 12, 14 which permits them to be very useful for image compression. Each eight-by-eight p(i,j) array, such as spatial domain arrays 30, 32, 34, and 36, contains values representing an eight-by-eight portion of an image. For image compression arrays 30, 32, 34, and 36 may each be transformed into corresponding eight-by-eight f(u,v) arrays 38, 40, 42, and 44 in the frequency domain using forward discrete cosine transform 12 as set forth as Equation (1). Various compression algorithms may then be applied to f(u,v) arrays 38, 40, 42, and 44. To reconstruct the original images represented by spatial domain arrays 30, 32, 34, and 36, the compression algorithm is reversed to yield f(u,v) arrays 38, 40, 42, and 44. Inverse discrete cosine transform 14, set forth as Equation (2), is then applied to f(u,v) arrays 38, 40, 42, and 44 to provide p(u,v) arrays 30, 32, 34, and 36.

Referring to Equation (2), it can be seen that each p(i,j) is a result of a double summation. For a given i,j,u, and v, all the constants, C(u), C(v), cosval(i,u), and cosval(j,v), may be combined into one constant K(i,j,u,v). The K(i,j,u,v) constant may even include the ($\frac{1}{4}$) in these constants. Thus Equation (2) becomes:

$$p(i,j) = \sum_{u=0}^{7} \sum_{v=0}^{7} K(i,j,u,v) * f(u,v) \qquad \text{Equation (3)}$$

Thus straight forward calculation of the inverse discrete cosine transform of Equation (2) requires sixty-four floating-point multiplications per pixel. This is approximately five million multiplications for a modest size three-hundred twenty by two-hundred forty pixel image.

However, there are methods known in the prior art to reduce this computational requirement by several orders of magnitude. One method known in the prior art reduces the computation required to sixteen integer multiplications per pixel. Another prior art method, based upon further mathematical manipulation, can calculate the discrete cosine transforms 12, 14 using only two and three-quarters multiplications per pixel. However, even these methods still require too much computation to perform discrete cosine transforms 12, 14 for many applications.

These prior art methods must allow for the fact that the dynamic range of the f(u,v) values is eight times the range of the p(i,j) values, ±1024 versus ±128. This is required in order to preserve all the information in the p(i,j) spatial domain values when they are converted to the f(u,v) values of the frequency domain. Additionally, these prior art methods must allow for the fact that both the p(i,j) values of the spatial domain and f(u,v) values of the frequency domain are signed numbers. If forward discrete cosine transform 12 is used on eight-bit pixel values, for example, which have a numerical range of zero to two hundred fifty five, then one hundred twenty eight must subtracted from the pixel values to cause them to have the required range of negative one hundred twenty eight to positive one hundred twenty seven. This subtraction must be performed prior to using forward discrete cosine transform 12. Similarly, after performing inverse discrete cosine transform 14 one hundred twenty eight must be subtracted to return the pixel values to their proper range.

Another known improvement reduces the number of multiplications to sixteen per pixel, as previously described. This improvement was developed by determining that inverse discrete cosine transform Equation (2) may be rewritten as:

$$p(i,j) = 1/2 \sum_{u=0}^{7} C(u) cosval(i,u) \left[ 1/2 \sum_{v=0}^{7} C(v) cosval(j,v) f(u,v) \right] \qquad \text{Equation (4)}$$

Both two-dimensional inverse discrete cosine transform 14 and forward discrete cosine transform 12 are separable transforms. Thus, two-dimensional inverse discrete cosine transform 14 can be separated into two one-dimensional inverse discrete cosine transforms. Each of the one-dimensional transforms is being of the form:

$$p(i) = (1/2) \sum_{u=0}^{7} C(u) cosval(i,u) f(u) \qquad \text{Equation (5)}$$

Equation (5) represents a one-dimensional discrete cosine transform between two eight-element arrays p(i) and f(u). The separability of two-dimensional discrete cosine transforms 12, 14 thus means that they can be calculated as sixteen one-dimensional discrete cosine transforms. One-dimensional inverse discrete cosine transforms are first performed on each of the eight rows of f(u,v) matrix 16 to form a resulting intermediate array (not shown). One-dimensional discrete cosine transforms are then performed on each of the eight columns of the resulting intermediate matrix. The result of these operations is the same p(i,j) coefficient array 10 as computed using inverse discrete cosine transform 14.

According to Equation (5), there are sixty-four multiplications in a one-dimensional discrete cosine transfer. Sixteen one-dimensional discrete cosine transforms are required for two-dimensional discrete cosine transforms 12, 14. Thus a total of sixteen times sixty-four multiplications ar required for two-dimensional discrete cosine transform 12, 14 using this prior art method. Since there are sixty-four pixels this equals sixteen multiplications per pixel. Thus the number of multiplications per pixel is reduced by a factor of four in this prior Still further improvement in the number of multiplications required may be obtained by considering the sixty four constants used by the one-dimensional discrete cosine transform as set forth in Equation (5). Ignoring the factor ($\frac{1}{2}$) in Equation (5), as well as the values of C(u), consider only the cosval(i,u) values. From the original equations:

$$\text{cosval}(i,u) = \cos(2i + 1)u*\pi/16$$
$$= \cos(M*\pi/16)$$

where $M = (2i+1)u$.

Referring now to Table I, the values of M for all sixty-four constants are set forth,

TABLE I

| 0 | 1  | 2  | 3  | 4  | 5  | 6  | 7   |
|---|----|----|----|----|----|----|-----|
| 0 | 3  | 6  | 9  | 12 | 15 | 18 | 21  |
| 0 | 5  | 10 | 15 | 20 | 25 | 30 | 35  |
| 0 | 7  | 14 | 21 | 28 | 35 | 42 | 49  |
| 0 | 9  | 18 | 27 | 36 | 45 | 54 | 63  |
| 0 | 11 | 22 | 33 | 44 | 55 | 66 | 77  |
| 0 | 13 | 26 | 39 | 52 | 65 | 78 | 91  |
| 0 | 15 | 30 | 45 | 60 | 75 | 90 | 105 |

Since $M = (2i+1)u$, the values in row i of Table I are multiples $(2i+1)$. Each of these corresponds to the cosine of $M*\pi/16$. But the cosine function is periodic and symmetrical in various ways as well. Thus, the cosine of $M*\pi/16$, for any M, is equal to either the positive or negative cosine of $M*\pi/16$ with M between zero and seven. For example, $\cos(35*\pi/16) = \cos(3*\pi/16)$, since the cosine function repeats every thirty-two values of M. Thirty values of M corresponds to $2*p(i)$. Thus, the array of Table I may be reduced to the cosines set forth in Table II.

TABLE II

| 0 | 1  | 2  | 3  | 4  | 5  | 6  | 7  |
|---|----|----|----|----|----|----|----|
| 0 | 3  | 6  | −7 | −4 | −1 | −2 | −5 |
| 0 | 5  | −6 | −1 | −4 | 7  | 2  | 3  |
| 0 | 7  | −2 | −5 | 4  | 3  | −6 | −1 |
| 0 | −7 | −2 | 5  | 4  | −3 | −6 | 1  |
| 0 | −5 | −6 | 1  | −4 | −7 | 2  | −3 |
| 0 | −3 | −6 | 7  | −4 | 1  | −2 | 5  |
| 0 | −1 | 2  | −3 | 4  | −5 | 6  | −7 |

Within Table II, a negative sign before a value of M indicates that a constant is $-\cos(M*\pi/16)$ rather than $\cos(M*\pi/16)$. From the contents of Table II, it can be seen that there is a great deal of redundancy when computing the one-dimensional discrete cosine transform using Equation (1). For example, when computing each p(i) value there is a multiply f(4) by the same constant (M=4) all eight times in the fifth column of Table II. These multiplies differ only by their sign. Similarly, f(0), set forth in the first column of Table II, is always multiplied by M=0 when performing this transform. Additionally, f(2) is multiplied by only two different constants, either by M=2 or by M=6.

Thus in this method all eight p(i) values are calculated at the same time using one calculation. Only the minimum number of multiplications of f(u) values by constants are performed and an overall savings are achieved by reusing these intermediate results. Algorithms of this type are called fast cosine transform algorithms, and are analogous to the well-known fast fourier transform.

Further improvement may be obtained using a method requiring eleven multiplications instead of sixty-four for a one-dimensional discrete cosine transform. Such a method is taught in Loeffler, Ligtenberg, and Moschytz in "Practical Fast 1-D DCT Algorithms With 11 Multiplications," IEEE Transactions, 1989. It can be proven mathematically that eleven multiplications is the minimum possible for a one-dimensional fast cosine transform as taught in the prior art. Using this improvement a two-dimensional discrete cosine transform only requires 11*16/64 = 2.75 multiplications per pixel.

Thus, many improvements upon basic forward discrete cosine transform 12 and inverse discrete cosine transform 14 are known in the prior art. However, in all of these prior art methods, in spite of the benefits of the improved discrete cosine transforms 12, 14 for image compression, many clock cycles are still required to perform the remaining multiplications. Calculations of prior art forward discrete cosine transform 12 and inverse discrete cosine transform 14 which eliminate some multiplications are still very time consuming because of these remaining multiplications. It will be understood that prior art improved discrete cosine transforms are still very expensive because on most processors a multiply instruction is significantly more time consuming than an add operation or a shift operation. On processors that do not have a hardware multiplier, the difference in the number of cycles is very dramatic. This difference may be as much as a factor of ten or twenty. It will be understood by those skilled in the art that the computational time requirements of inverse discrete cosine transform 14 are very similar to the computational time requirements of forward discrete cosine transform 12.

SUMMARY OF THE INVENTION

A method is disclosed for performing a discrete cosine transform on a transform input value wherein the discrete cosine transform has a plurality of predetermined transform coefficients. A number $N_1$ of shift operations is determined only in accordance with the transform coefficients in order to provide a set of $N_1$ shift operations. A number $N_2$ of add operations is determined only in accordance with the transform coefficients to provide a set of $N_2$ add operations. The transform input value is operated upon only by the $N_1$ shift operations and the $N_2$ add operations to provide a discrete cosine transform output value.

DETAILED DESCRIPTION OF THE INVENTION

Figure 1:
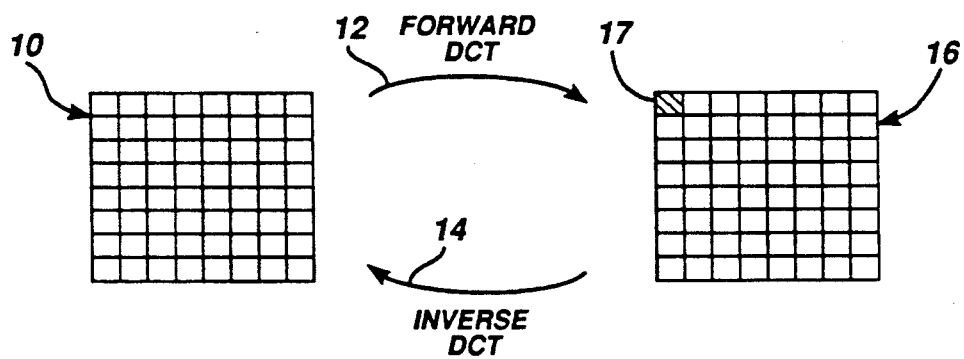
FIG. 1 shows a schematic representation of prior art forward and inverse discrete cosine transforms applied to eight-by-eight arrays representative of spatial domain information and frequency domain information.
Figure 2A:
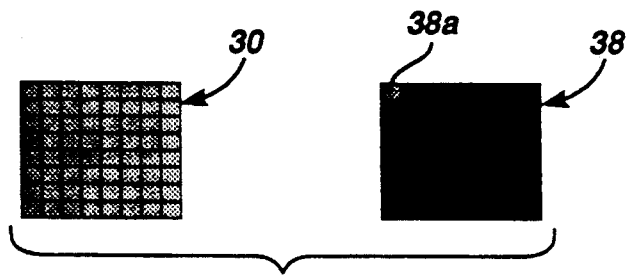
FIGS. 2A-D show a schematic representation of prior art forward and inverse discrete cosine transforms applied to eight-by-eight arrays representative of spatial domain information and frequency domain information wherein the spatial domains are provided with varying intensity distributions.
Figure 2B:
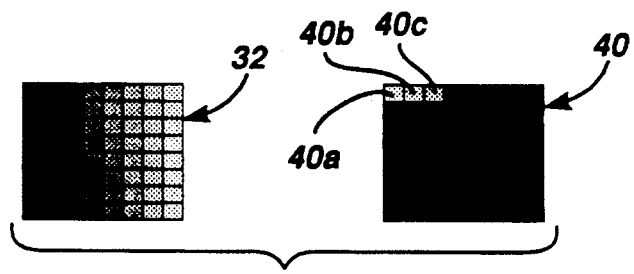
Figure 2C:
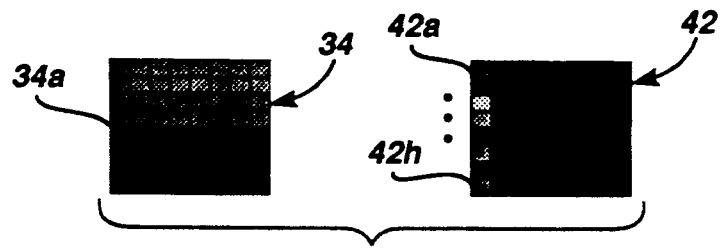
Figure 2D:
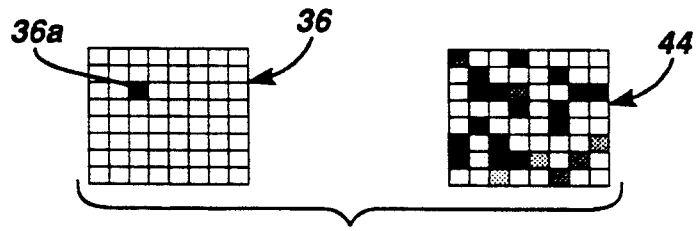
Figure 3:
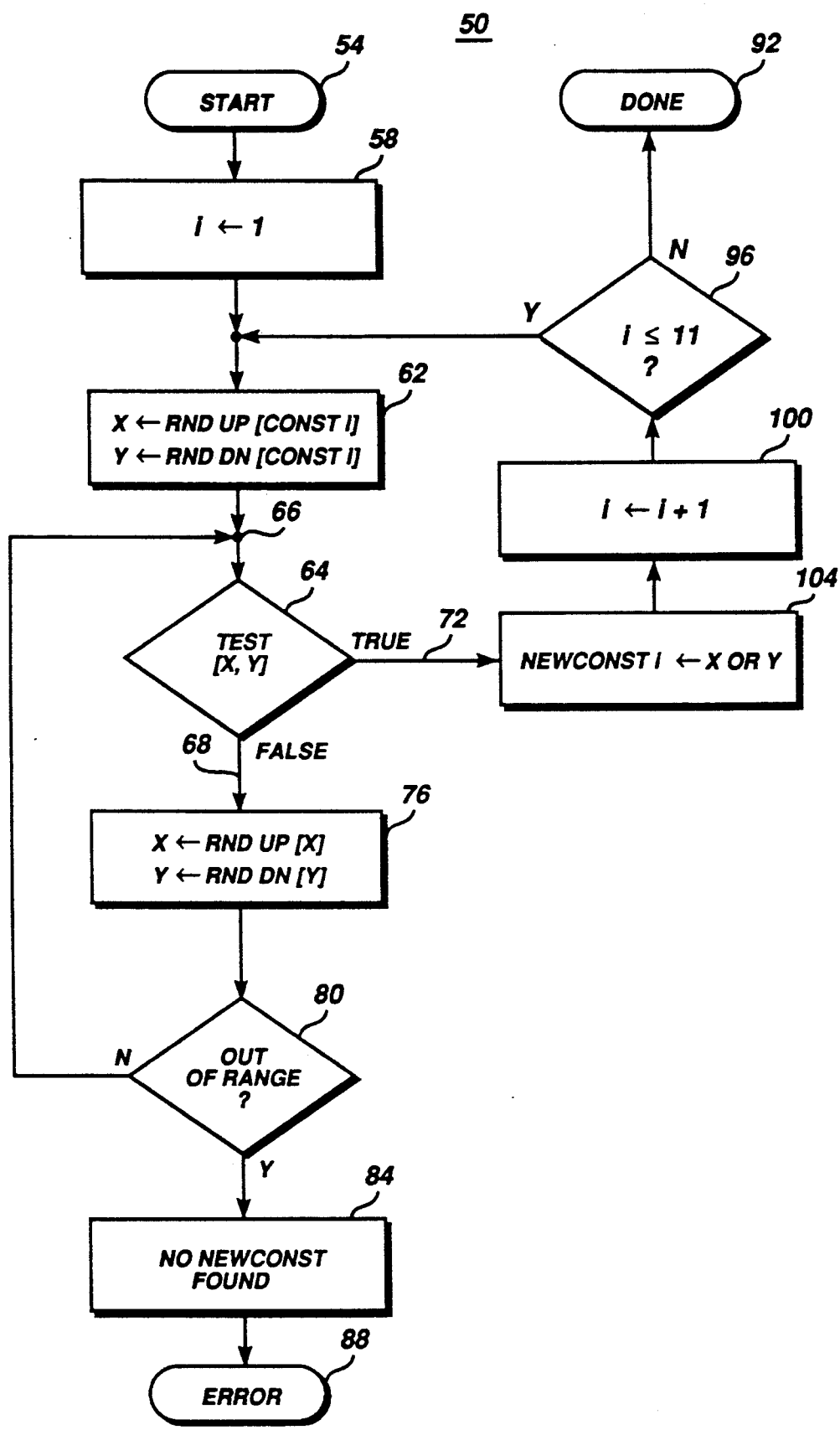
FIG. 3 shows a sample algorithm for providing the simplified discrete cosine transform coefficients of the present invention.

Referring now to FIG. 3, there is shown a flow chart representation of discrete cosine transform constant simplification method 50 of the present invention. In order to greatly decrease the amount of time necessary to perform discrete cosine transforms 12, 14, constant simplification method 50 provides coefficients which permit the discrete cosine transform system of the present invention to provide a one-dimensional fast cosine transform method that uses no multiplications at all.

In order to provide simplified transform constants, discrete cosine transform constant simplification method 50 truncates the least significant bits of the constants of discrete cosine transforms 12, 14. This simplification results in a small loss in arithmetic accuracy. This loss in arithmetic accuracy is limited to an amount which produces acceptable image quality. In order to limit the loss of accuracy in this manner, the number of bits truncated is selected to be less than what would cause unacceptable image degradation.

Selected remaining bits of the truncated constants are then modified by constant simplification method 50. After this modification, input values from frequency domain array 16 are multiplied by the simplified constants to provide the resulting product values of spatial domain array 10. However, the modification of the constants in the system of the present invention is adapted to permit the determination of these resulting product values by applying two or fewer shift operations, along with any required add operations, to the values of frequency domain array 16. Thus the product values resulting from multiplying the input values by the simplified constants, may be obtained using only shift and add operations without any multiplication operations. It will therefore be understood that using the system of the present invention, inverse discrete cosine transform may be performed without any multiplications.

This modification of the truncated constants by constant simplification method 50 may result in a further decrease in arithmetic accuracy. However, the modification of constant simplification method 50 is adapted to result in no noticeable degradation of image quality. Shift criteria limiting the number of shifts to a value other than two may be used depending on the amount of image degradation which may be tolerated in a particular application. A further consideration with respect to the number of shifts is the amount of hardware or software which may be used to implement multiplyless discrete cosine transform 14 using constants provided by constant simplification method 50.

In this manner, both discrete cosine transforms 12, 14 may be performed with only shift operations and add operations. In particular, the new simplified constants provided by constant simplification method 50 of the present invention are adapted to perform reverse discrete cosine transform 14. However the system of the present invention may be readily adapted to provide simplified constants for performing forward discrete cosine transform 12.

Within the accuracy limitations required in an application, the number of shift operations and add operations required to perform discrete cosine transforms 12, 14 in the method of the present invention depends only upon the predetermined discrete cosine transform coefficients themselves. In particular the number of shift and add operations required to perform discrete cosine transforms 12, 14 with these simplified constants is completely independent of any input values upon which discrete cosine transforms 12, 14 may be performed. Thus the shift and add operations of the system of the present invention may be hardwired when implemented in electronic circuitry or implemented as constants in arithmetic routines by computer software.

It is possible to reduce the number of shift operations and add operations required to perform discrete cosine transforms 12, 14 in this manner without noticeable degradation in picture quality because the calculations performed by the simplified constants are performed while transforming either into or out of the frequency domain. Therefore if slight errors are made in performing the calculations of inverse discrete cosine transforms 12, 14, the resulting visual errors are spread over all sixty-four pixels in any resulting eight-by-eight spatial domain arrays 10 of pixel values. This prevents the resulting visual errors from being very noticeable. Because the information content of most common images is inherently low-frequency, these errors are made less noticeable by the fact that they tend to occur at higher frequencies.

The eleven multiplication constants of a fast cosine transform algorithm are shown in Table III.

TABLE III

| | |
|---|---|
| 1. | $\cos(3*\pi/16) + \sin(3*\pi/16)$ |
| 2. | $\sin(3*\pi/16) - \cos(3*\pi/16)$ |
| 3. | $\cos(3*\pi/16)$ |
| 4. | $\cos(\pi/16) + \sin(\pi/16)$ |
| 5. | $\sin(\pi/16) - \cos(\pi/16)$ |
| 6. | $\cos(\pi/16)$ |
| 7. | $\sqrt{2}\,[\cos(6*\pi/16) + \sin(6*\pi/16)]$ |
| 8. | $\sqrt{2}\,[\sin(6*\pi/16) - \cos(6*\pi/16)]$ |
| 9. | $\sqrt{2}\,[\cos(6*\pi/16)]$ |
| 10. | $2*\cos(4*\pi/16)$ |
| 11. | $2*\cos(4*\pi/16)$ |

Using discrete cosine transform constant simplification method 50 of the present invention, the values of Table III may be replaced with the simpler inverse discrete cosine transform constants shown in Table IV, expressed as fixed point sixteen bit hexadecimal values.

TABLE IV

| | |
|---|---|
| 1. | 1.60 |
| 2. | −0.40 |
| 3. | 0.d0 |
| 4. | 1.40 |
| 5. | −0.c0 |
| 6. | 1.00 |
| 7. | 1.e0 |
| 8. | 0.c0 |
| 9. | 0.80 |
| 10. | 1.80 |
| 11. | 1.80 |

When this replacement is performed, the sixth of the eleven constants becomes exactly equal to one, as shown in Table IV. Thus multiplication by this constant is eliminated entirely.

Discrete cosine transform constant simplification method 50 may be used to determine the simplified inverse discrete cosine transform constants of Table IV from the eleven constants of Table III in the following manner. Execution of constant simplification method 50 begins at start terminal 54 and proceeds to block 58 where a counter i is given the value of one. Execution of constant simplification method 50 then proceeds to rounding block 62 where the ith constant of Table III is modified. The ith constant is rounded up by routine RNDUP to provide the value X. The ith constant of Table III is also rounded down by routine RNDDN to provide the value Y in rounding block 62. For example, when i is given the value one in block 58, constant i from Table III is 1.63. The value 1.63 is therefore rounded up by routine RNDUP and X is assigned the value 1.7 in rounding block 62. The value 1.63 is rounded down by routine RNDDN and Y is given the value of 1.6 in block rounding 62.

Execution of constant simplification method 50 then proceeds to test diamond 64 by way of test entrance line 66. In test diamond 64 the values of X and Y are tested to determine whether they meet the shift criteria of method 50. The shift criteria test performed in test diamond 64 of method 50 is a test to determine whether the product provided by multiplying a multiplicand value by either X or Y may be obtained using two or fewer shift operations of the multiplicand value, along with the required number of add operations.

For example, when Y has the hexadecimal value 1.60, Y may be represented by the binary string 0001.0110. It will be understood by those skilled in the art that the product resulting from multiplying a multiplicand value by the binary string 1.011 may be obtained by performing two successive eight bit shifts of the multiplicand value and adding each of the two shift results to the original unshifted multiplicand value. Thus, the value 1.60 meets the test criteria of test diamond 64 since a multiply of 1.60 by a multiplicand value can be accomplished with two or fewer shifts of the multiplicand value and some add operations. Thus, the shift criteria test of test diamond 64 provides a TRUE when X has the value 1.60.

If either X or Y meets these test criteria, as determined within test diamond 64, and a TRUE value is determined, execution of discrete cosine transform constant simplification method 50 proceeds by way of true test line 72 to new constant block 104. In new constant block 104 the ith new constant is given the value of either X or Y, whichever value passed the test performed within test diamond 64. For example, when i has the value one and X passes the shift criteria of test diamond 64 with a value 1.6, the first new constant is assigned the value 1.6 as shown in Table IV.

After a value is assigned to new constant i the counter is incremented in block 100. A determination is then made in decision diamond 96 whether all the constants of the transform have been simplified by constant simplification method 50 to provide the simplified new constants for performing discrete cosine transforms 12, 14 according to the multiplyless method of the present invention. If all the constants of Table III have been processed, execution proceeds to terminal 92 and discrete cosine transform constant simplification method 50 is completed.

If neither the value of X nor the value of Y meets the shift criteria as determined by test diamond 64, execution of discrete cosine transform constant simplification method 50 proceeds by way of false test line 68 to rounding block 76. In rounding block 76, the RNDUP and RNDDN routines are performed upon the values of X and Y, respectively. Routines RNDUP and RNDDN are adapted to return the next highest and the next lowest values of X and Y respectively. Thus, for example, if X has the value 1.7 prior to execution of rounding block 76, X is assigned the value 1.8 during execution of rounding block 76. If Y has the value 1.6 before the execution of rounding block 76, Y is assigned the value 1.5 during the execution of rounding block 76.

As a further example, when i has the value four, constant i has the value 1.2 d as determined from Table III. Prior to execution of rounding block 76, when execution of constant simplification method 50 proceeds to rounding block 62, X is assigned the rounded up value 1.3 by routine RNDUP when RNDUP operates upon constant i. In the same manner, Y is assigned the rounded down value 1.2 by the routine RNDDN in rounding block 62. The value of X, 1.3, may thus be represented by the binary string 0001.0011 and the value of Y may be represented by the binary string 0001.0010. Neither of these binary strings passes the test criteria of test diamond 64 because the product resulting from multiplying X and Y by a multiplicand value cannot be obtained using three or fewer shifts of the multiplicand value. Thus, execution proceeds by way of false test line 68 to rounding block 76, where routine RNDUP operates upon the value of X and assigns the value 1.4 to X. The routine RNDDN operates upon Y and assigns the value 1.1 to Y.

A determination is then made in out-of-range decision diamond 80 whether the values of X or Y are out of range. The more times that rounding block 76 is executed within constant simplification method 50, the less accuracy is obtained when performing discreet cosine transforms 12, 14 using the new constants determined by method 50. This occurs because the simplified constant values of X and Y are caused to move farther away from the starting value of constant i in Table III by routines RNDUP and RNDDN. Thus, the allowed range of X and Y in decision diamond 80 is determined by the amount of arithmetic error which may be tolerated in a system using discrete cosine transform constant simplification method 50 before unacceptable image degradation occurs.

If the values of X or Y do not pass the out of range test as determined in decision diamond 80, then no new constant can be found for constant i as shown in block 84, and an error message is provided at terminal 88. If X and Y are still in range, as determined in decision diamond 80, execution of constant simplification method 50 proceeds to test diamond 64 in order to test the new values of X and Y provided in rounding block 76. As previously described, this test results in a TRUE determination if, after the operations of block 76, the product obtained by multiplying either X or Y by a multiplicand value may be determined by means of three or fewer shift operations along with the required number of additions. For example, when i has the value four and X is assigned the value 1.4 by routine RNDUP, X meets the shift criteria of test diamond 64 since a multiplicand value may be multiplied by 1.4 using fewer than three shift operations. It will be noted that the fourth new constant set forth in Table IV is therefore 1.4.

Discrete cosine transform constant simplification method 50 thus provides the approximations set forth in Table IV. The approximations of Table IV are the simplified constants based upon the constants of Table III. The approximations provided in Table IV are rounding approximations selected to be as close to the original values of Table III as possible while still permitting multiplies by constants in Table IV using no more than three shift operations and addition operations.

It will be understood that the method of the present invention may be performed using any method of varying the values of Table III, as long as the resulting values meet the tests determined by the permitted number of shifts and adds. Thus, it will be understood that constants differing from those set forth in Table IV may be obtained and that the differing constants may be optimized for differing purposes. The choice of simplified constants is a tradeoff between the simplicity of implementation in either hardware or software, and the accuracy of computation. Constants providing more accurate the calculations require a larger total number of shifts and adds. The values set forth in Table IV are preferred for simplicity of implementation. Table V sets forth a further set of simplified values which are preferred for accuracy of computation. It will be understood that many other sets of simplified constants may be obtained.

TABLE V

| | |
|---|---|
| 1. | 1.62 |
| 2. | −0.46 |
| 3. | 0.04 |
| 4. | 1.2c |
| 5. | −0.c8 |
| 6. | 0.fa |
| 7. | 1.da |
| 8. | 0.c0 |
| 9. | 0.8c |
| 10. | 1.6a |
| 11. | 1.6a |

Figure 4:
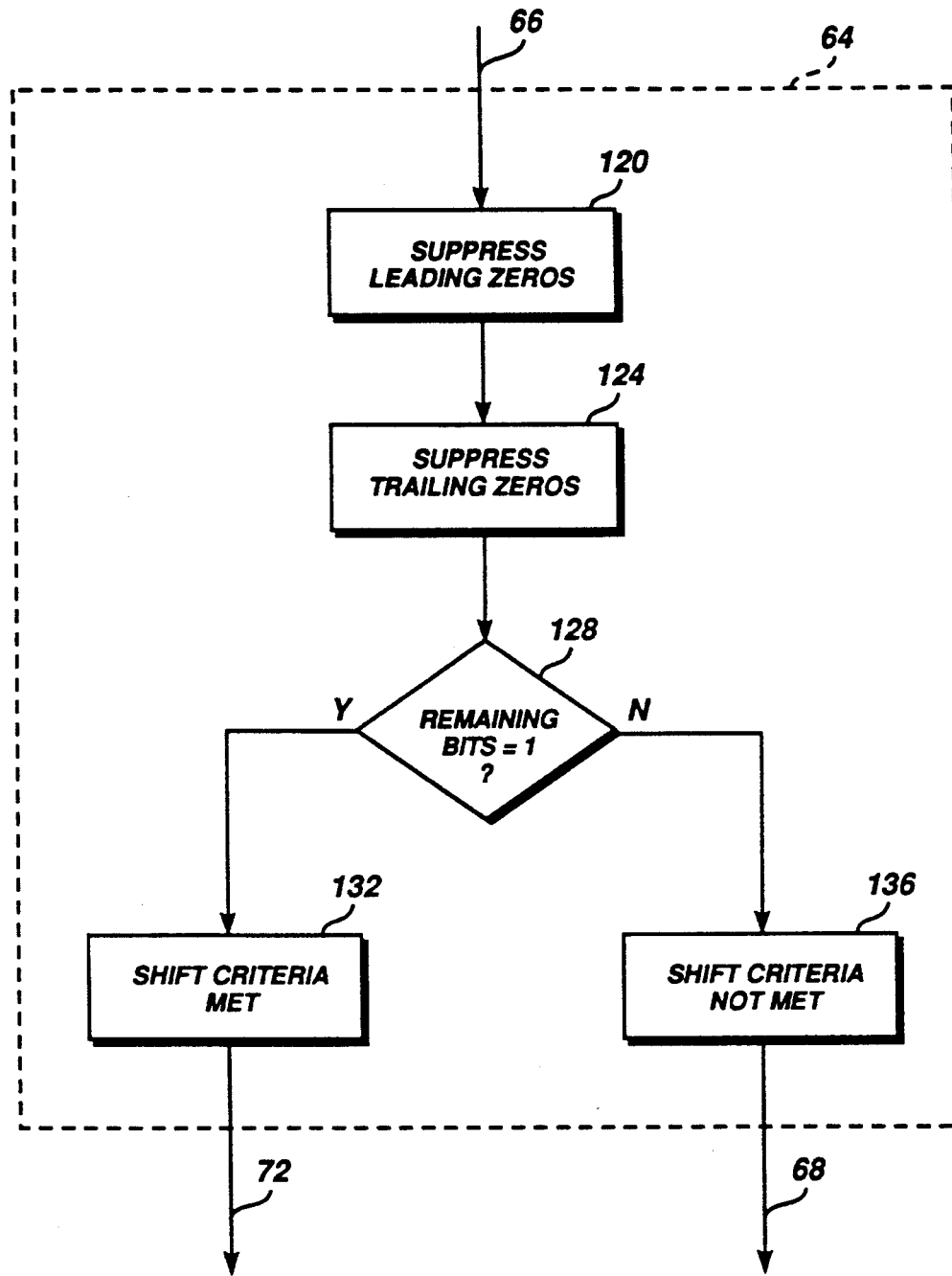
FIG. 4 shows a more detailed block diagram representation of a test performed in the algorithm of FIG. 3.

Referring now to FIG. 4, there is shown a more detailed flowchart representation of test diamond 64 or shift criteria test procedure 64. Execution of discrete cosine transform constant simplification method 50 enters shift criteria test procedure 64 from rounding block 62 by way of test entrance line 66. Within shift criteria test procedure 64, the leading zeros of the values of X and Y are suppressed, as shown in suppression block 120. The trailing zeros of X and Y are also suppressed within shift criteria test procedure 64, as shown in suppression block 124.

In decision diamond 128 of test procedure 64 a determination is made whether each of the remaining bits of either X or Y is a one. If each of the remaining bits of either value X or value Y is a one after suppression of leading and trailing zeros in suppression blocks 120, 124, then the shift criteria of test procedure 64 are met as shown in block 132. Execution of constant simplification method 50 proceeds from shift criteria test procedure 64 by way of true test line 72 to block 104 with a value of TRUE. In block 104, the value of either X or Y is assigned to new constant i depending on which of the two values met the shift criteria of shift criteria test procedure 64 as previously described. It will be understood by those skilled in the art that only one of the two values X and Y must meet the shift criteria of test procedure 64 in order for test procedure 64 to be TRUE.

If each of the remaining bits of the values X and Y are not one, as determined in decision diamond 128, the shift criteria of test procedure 64 are not met as shown in block 136. Execution of discrete cosine transform constant simplification method 50 proceeds from block 136 of shift criteria test procedure 64 to rounding block 76 by way of false test line 68 with a value of FALSE.

It will be understood by those skilled in the art that many other methods (not shown) may be used, in addition to constant simplification method 50, in order to obtain the simplified constants set forth in Table IV for performing inverse discrete cosine transform 14. It will also be understood that the plurality of differing methods (not shown) may be used for determining similar simplified constants for performing forward discrete cosine transform 12. Finally, it will be understood that differing values of simplified constants may be used when performing discrete cosine transforms 10, 12 in accordance with the method of the present invention, provided that the constants are adapted such that transforms 12, 14 may be performed using only a predetermined number of shift operations without any multiplication operations. As previously described, the predetermined number of shift operations is selected in accordance with the amount of image degradation which may be tolerated in a particular application.

Determination of the simplified constants for forward discrete cosine transfer 12 using discrete cosine transform constant simplification method 50 is similar to the illustrated determination of the simpler constants of Table IV for inverse discrete cosine transform 14. This determination is easily performed by one skilled in the art in view of the teaching of the determination of simpler constants for inverse discrete cosine transform 14. At the cost of a small amount of computation accuracy, which is not noticeable in the resulting images, the speed of inverse discrete cosine transform 12 is greatly increased using the simplified constants of Table IV provided by discrete cosine transform constant simplification method 50 of the present invention.

Figure 5:
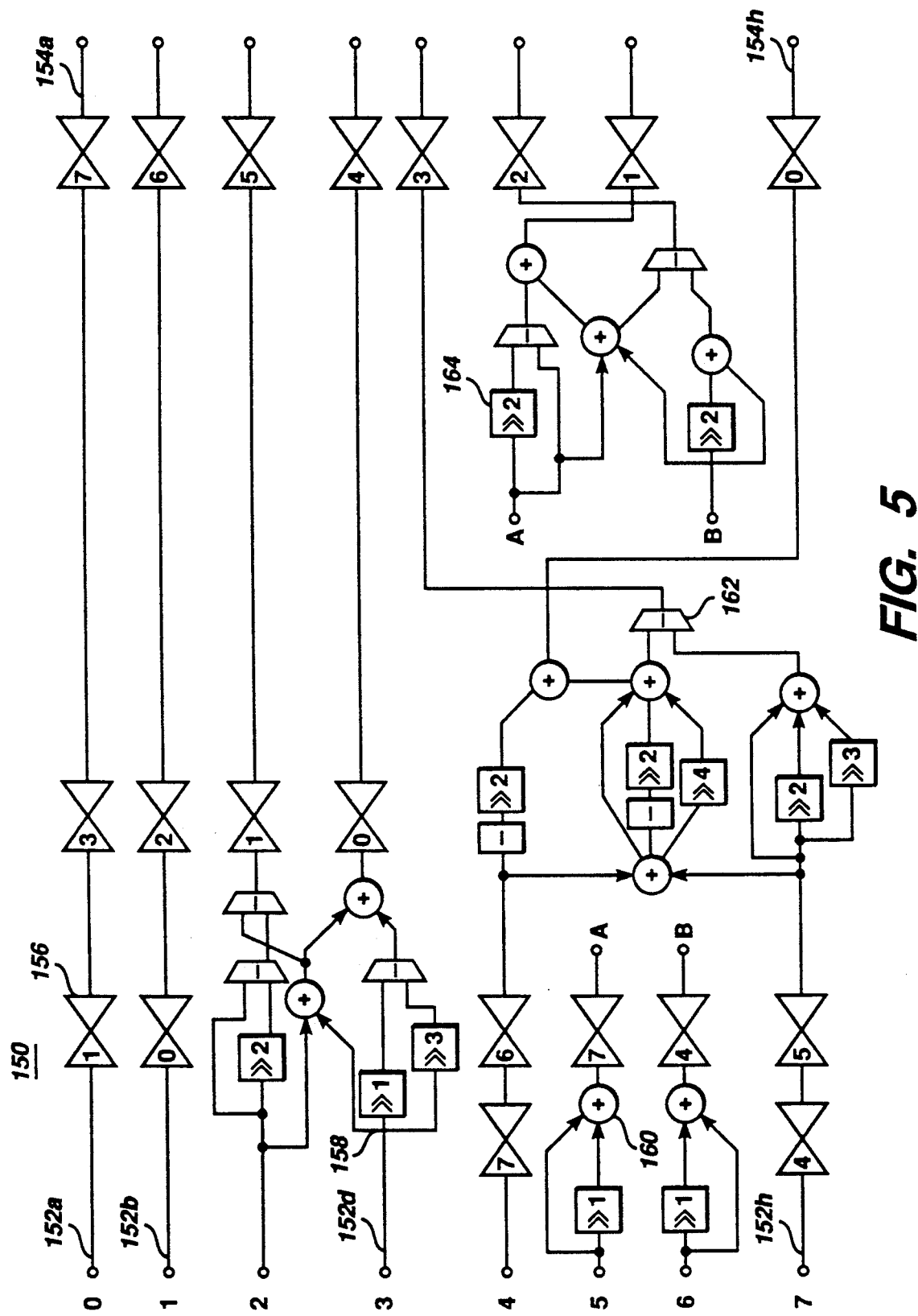
FIG. 5 shows a discrete cosine transform device for performing the multiplyless inverse discrete cosine transform of the present invention.

Referring now to FIG. 5, there is shown multiplyless inverse discrete cosine transform device 150 of the present invention for performing inverse discrete cosine transform 14 according to the simplified constants set forth in Table IV. Multiplyless inverse discrete cosine transform device 150 is provided with transform input buses 152a–h to receive frequency domain information. This information is representative of frequency of coefficients an image being processed as previously described with respect to frequency domain array 16. Multiplyless inverse discrete cosine transform device 150 is also provided with transform output buses 154a–h which provide the pixel information of spatial domain array 10. The pixel domain information which appears on transform output buses 154a-h corresponds to the frequency domain information applied to transform input buses 152a-h and transformed by transform device 150.

The pathways of multiplyless discrete cosine transform device 150 of the present invention are formed entirely of shifters and adders. No multipliers are present within inverse discrete transform device 150 because the transform constants implemented by transform device 150 are adapted to require only shifts and adds. These constants are provided by a constant simplification method such as constant simplification method 50. In particular the simplified constants implemented by transform device 150 are adapted to require only shifts of two or fewer bit locations.

Adder 156 of discrete cosine transform device 150 is defined to be effective to add: 1) binary word 0 applied to the input of adder 156 on transform input bus 152a, and 2) binary word 1 applied to transform input bus 152b. This is indicated within the schematic representation device 150 because 1) binary word 0 on transform input bus 152a is applied to the input of adder 156, and 2) the numeral 1, representative of binary word 1, on input bus 152b appears within the symbolic representation of adder 156.

In a similar manner, it will be understood that adder 172 of pathway 178 adds the output of adder 170 to the binary word 7. Binary word 7 is the word applied to discrete cosine transform device 150 by way of input 152h. Likewise adder 176 of pathway 180 adds the output of summation node 160 to the input word of input 152h.

Shifter 158 of transform device 150 serves to shift binary word 3, applied to the input of shifter 158 by way of transform input bus 152d, one bit to the right. The shift to the right operation of shifter 158 is indicated by the two greater than signs which appear within the symbolic representation of shifter 158. The number of bit positions which binary word 3 is shifted is indicated by the numeral 1 within the symbolic representation of shifter 158. That the shift operation of shifter 158 is performed upon binary word 3 is indicated by the application of binary word 3 to the input of shifter 158 by way of transform input bus 152d.

In a similar manner shifter 184 receives the signal of pathway 182 and shifts it two positions to the right. Shifter 186 receives the same input as shifter 184 and shifts it three positions to the right. The outputs of shifters 184, 186, as well as their input, are then summed by summing node 188. Note that the signal of pathway 174 is inverted by inverter 190 prior to shifting by shifting 192.

Adder 160 of multiplyless transform device 150 is a conventional adder wherein the sum of the input lines of adder 160 is applied to an output line of adder 160. The output provided by adder 160 is the sum of binary word 5 and binary word 5 shifted to the right one bit. Subtracter 162 of transform device 150 is a conventional subtracter wherein the signal of one input line of subtracter 162 is subtracted from the signal of the other input line. The resulting difference is applied to the output line of subtracter 162.

Binary word 2 is shifted only once as it is transmitted along the pathways of multiplyless transform device 150. This single two bit shift of binary word 2 is performed by shifter 157. Two binary shift operations are performed upon input binary word 5. These two shift operations are performed by shifters 162, 164. The shift operations of shifters 162, 164 are one bit and two bits respectively. It will be understood in this manner by those skilled in the art that the total number of shift operations of any pathway through transform device 150 contains two or fewer shifts.

It will also be understood by those skilled in the art that a multiplyless forward discrete cosine transform device (not shown) may be provided in a manner similar to that described for multiplyless inverse discrete cosine transform device 150. As previously described, the forward transform coefficients may be determined by those skilled in the art in a manner similar to that described for determining the inverse transform coefficients by means of constant simplification algorithm 150. The forward transform coefficients, once determined in this manner, may be realized in a hardware configuration in the same manner that inverse discrete cosine transform device 150 realizes the coefficients determined using constant simplification method 50. Furthermore, it will be understood that when the method of the present invention is applied with a limitation other than two or fewer shifts, the resulting coefficients may also be realized in a hardware configuration (not shown) similar to transform device 150 by those skilled in the art.

It will be understood that various changes in the details, materials and arrangements of the parts which have been described and illustrated in order to explain the nature of this invention may be made by those skilled in the art without departing from the principle and scope of the invention as expressed in the following claims.

I claim:

1. A method for performing a multiplyless discrete cosine transform operation upon a transform input signal to produce a discrete cosine transform output signal, in a system having a transform device including a shifter and a counter, said discrete cosine transform operation having a plurality of predetermined transform coefficients, comprising the steps of:
    (a) determining by said counter a first limit $N_1$ independently of said transform input signal to provide a set of shift operations, said set of shift operations including only $N_1$ shift operations;
    (b) determining by said counter a second limit $N_2$ independently of said transform input signal to provide a set of add operations, said set of add operations including only $N_2$ add operations; and,
    (c) applying only said set of shift operations and said set of add operations to said transform input by said transform device to produce said discrete cosine transform output signal only in accordance with said transform input signal, said $N_1$ shift operations, and said $N_2$ add operations, to thereby provide said multiplyless discrete cosine transform operation.

2. The method for performing the multiplyless discrete cosine transform operation of claim 1, wherein said limits $N_1$ and $N_2$ are determined by said transform device only in accordance with said predetermined transform coefficients.

3. The method for performing the multiplyless discrete cosine transform operation of claim 1, wherein step (c) comprises the step of performing a forward discrete cosine transform operation upon said transform input signal.

4. The method for performing the multiplyless discrete cosine transform operation of claim 1, wherein step (c) comprises the step of performing a reverse discrete cosine transform operation upon said transform input signal.

5. The method for performing the multiplyless discrete cosine transform operation of claim 1, wherein step is preceded by the further step of providing said plurality of predetermined transform coefficients by simplifying a further plurality of transform coefficients.

6. The method for performing the multiplyless discrete cosine transform operation of claim 5, wherein the step of simplifying comprises truncating by a truncator said further plurality of transform coefficients.

7. The method for performing the multiplyless discrete cosine transform operation of claim 6, in a system for processing a video image wherein said truncating causes degradation of said video image, further comprising the step of truncating in accordance with a predetermined limitation in said degradation of said video image.

8. The method for performing the multiplyless discrete cosine transform operation of claim 5, comprising the further steps of:
(d) modifying said further plurality of transform coefficients to provide modified coefficient signal;
(e) determining whether multiplication by said modified coefficient signals requires fewer than a predetermined number of shift operations; and,
(f) selecting said predetermined transform coefficients from said modified coefficient signals in accordance with said determining of step (e).

9. The method for performing the multiplyless discrete cosine transform operation of claim 8, wherein said transform input signal is representative of a video image and said modifying of step (d) comprises modifying said further transform coefficients in accordance with a predetermined limitation in degradation of said image.

10. A method for performing the multiplyless discrete cosine transform on a transform input signal to produce a discrete cosine transform output signal in a transform device having a simplification system including a truncator, a shifter and an adder, said discrete cosine transform having a plurality of predetermined transform coefficients, in a system wherein said discrete cosine transform produces signal degradation, said system having a predetermined maximum signal degradation, comprising the steps of:
(a) receiving and varying said predetermined transform coefficients by said truncator in accordance with said maximum signal degradation to provide a set of modified transform coefficients; and,
(b) performing upon said transform input signal only shifts and adds by said shifter and said adder in accordance only with said modified transform coefficients to provide said multiplyless discrete cosine transform.

11. A system for receiving a plurality of input data words and providing a plurality of output transform data words representative of a discrete cosine transform of said input data words, comprising:

input means for receiving said input data words;
output means for providing said output transform data words;
a plurality of transform pathways between said input means and said output means for receiving said data words from said input means and applying said output transform data words to said output means;
at least one shifter within said transform pathways for shifting said input data words to produce said output transform data words and to apply said transform output data words to said output means; and,
said shifter including means for producing said output transform data words by performing fewer than three shift operations upon said input data words.

12. The discrete cosine transform system of claim 11, wherein said shifter means is adapted to apply an output transform data word representative of a forward discrete cosine transform of said input data word.

13. The discrete cosine transform system of claim 11, wherein said shifter means is adapted to apply an output transform data word representative of a reverse discrete cosine transform of said input data word.

14. The discrete cosine transform system of claim 11, wherein the number of shift operations performed upon said input data word by said shifter is independent of the value of said input data word.

15. The discrete cosine transform system of claim 11, wherein said data words are representative of a video image which is degraded by said discrete cosine transform and the number of shift operations performed upon said input data words by said shifter is determined in accordance with a limitation on the amount of degregation of said video image.

16. The discrete cosine transform system of claim 11, wherein said pathways are representative of a first plurality of discrete cosine transform coefficients of said discrete cosine transform.

17. The discrete cosine transform system of claim 16, wherein said first plurality of discrete cosine transform coefficients is a simplification of a second plurality of discrete cosine transform coefficients.

18. The discrete cosine transform system of claim 17, wherein said simplification comprises truncation by a truncator.

19. The discrete cosine transform system of claim 17, wherein said first plurality of discrete cosine transform coefficients is selected from modifications of said second plurality of discrete cosine transform coefficients in accordance with a determination whether multiplication by said modified second plurality of discrete cosine transform coefficients requires fewer than a predetermined number of shift operations by said shifter.

20. The discrete cosine transform system of claim 19, in a system for processing of video signals which are degraded by said coefficient simplification, wherein said predetermined number of shift operations by said shifter is selected in accordance with a predetermined limit in said image degradation.

* * * * *

UNITED STATES PATENT AND TRADEMARK OFFICE
CERTIFICATE OF CORRECTION

PATENT NO. : 5,285,402
DATED : February 8, 1994
INVENTOR(S) : Michael Keith

It is certified that error appears in the above-indentified patent and that said Letters Patent is hereby corrected as shown below:

Column 5, line 20, "prior" should read "prior art method."

Column 15, line 5, "step" should read "step (c)"

Column 15, line 23, "signal" should read "signals"

Column 16, line 17, "shifter means is" should read "shifter is"

Signed and Sealed this

Ninth Day of August, 1994

Attest:

BRUCE LEHMAN

Attesting Officer

Commissioner of Patents and Trademarks